(12) United States Patent
Yoshizawa

(10) Patent No.: US 7,865,133 B2
(45) Date of Patent: Jan. 4, 2011

(54) WIRELESS COMMUNICATION SYSTEM

(75) Inventor: Masayoshi Yoshizawa, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 547 days.

(21) Appl. No.: 11/886,719

(22) PCT Filed: Mar. 23, 2006

(86) PCT No.: PCT/JP2006/306594

§ 371 (c)(1),
(2), (4) Date: Dec. 5, 2007

(87) PCT Pub. No.: WO2006/104220

PCT Pub. Date: Oct. 5, 2006

(65) Prior Publication Data

US 2009/0029649 A1    Jan. 29, 2009

(30) Foreign Application Priority Data

Mar. 28, 2005   (JP) .............................. 2005-092011

(51) Int. Cl.
*H04H 1/00* (2006.01)
(52) U.S. Cl. .................... 455/3.01; 455/66.1; 455/509; 455/458
(58) Field of Classification Search ............. 455/3.01, 455/3.02, 3.03, 3.06, 66.1, 502, 509, 514, 455/154.1, 158.4, 186.1, 507, 511, 515, 41.2, 455/452.1, 458, 67.11, 277.1, 3.05
See application file for complete search history.

(56) References Cited

U.S. PATENT DOCUMENTS

| 5,497,372 | A | * | 3/1996 | Nankoh et al. | ............... 370/480 |
| 5,740,518 | A | * | 4/1998 | Takashima et al. | ............ 455/45 |
| 2004/0203911 | A1 | * | 10/2004 | Masuda et al. | ........... 455/456.1 |

FOREIGN PATENT DOCUMENTS

| JP | 10-51821 | 2/1988 |
| JP | 2-146828 | 6/1990 |
| JP | 5-130009 | 5/1993 |
| JP | 8-191468 | 7/1996 |
| JP | 8-340564 | 12/1996 |
| JP | 09-182132 | 7/1997 |

(Continued)

OTHER PUBLICATIONS

Notice of Reason for Rejection (in English language) issued Feb. 19, 2008.

(Continued)

*Primary Examiner*—John Lee
(74) *Attorney, Agent, or Firm*—Wenderoth, Lind & Ponack, L.L.P.

(57) ABSTRACT

In a wireless communication system in which center station equipment A wirelessly communicates with slave station devices B and C, the slave station devices do effective reporting. In the center station equipment, sending means 1 wirelessly sends character message information, which is to be processed by the slave station devices, to the slave station devices. At each slave station device, storage means stores information used for processing. Acquisition means 26 acquires the information used for processing. Receiving means 21 receives the character message information. Processing means processes the received character message information using the stored information and acquired information. Reporting means 23 and 24 report the contents of the character message information created by the processing.

7 Claims, 7 Drawing Sheets

FOREIGN PATENT DOCUMENTS

| | | |
|---|---|---|
| JP | 9-288787 | 11/1997 |
| JP | 2001-025045 | 1/2001 |
| JP | 2002-158612 | 5/2002 |
| JP | 2004-242154 | 8/2004 |

OTHER PUBLICATIONS

International Search Report (in English language) issued Jun. 27, 2006 in PCT/JP2006/306594 of which the present application is the U.S. National Stage.

Notification of Reasons for Refusal (in English language) issued Jun. 22, 2006.

Notification of Reasons for Refusal (in English language) issued Mar. 2, 2007.

Japanese Patent Office Notification of Reason(s) for Rejection (in English language) issued Aug. 19, 2008.

Notification of Reason for Refusal issued Sep. 11, 2007.

* cited by examiner

Character messages

```
This is [terminal station intrinsic information 1]
                                b1
Now, the water level (indicated) by [terminal station intrinsic information 2] has reached [terminal station telemeter information 1]
                                           b2                                                    b3
Everyone in [terminal station intrinsic information 3] district is [terminal station fixed phrase information (1)]
                      b4                                                b5
```
71

Fig.4

Terminal station message table    81

| Intrinsic information 1 | Disaster preventive stations A & B |
|---|---|
| Intrinsic information 2 | River C |
| Intrinsic information 3 | Town D |
| ⋮ | ⋮ |
| Telemeter information 1 | Water level indicator at point E in river C |
| Telemeter information 2 | Water level indicator at point F in river C |
| ⋮ | ⋮ |
| Fixed phrases | (1) Please keep off the river. |
|  | (2) Please gather round at meeting place G. |
|  | (3) Please evacuate at once. |
| ⋮ | ⋮ |

Fig.5

WIRELESS COMMUNICATION SYSTEM

TECHNICAL FIELD

The present invention relates to a wireless communication system in which center station equipment and slave station devices communicate wirelessly and, more particularly, to a technique for doing effective reporting at the slave station devices.

BACKGROUND ART

For example, in a general broadcast wireless system, center station equipment is installed in an administrative organ, and plural terminal station devices are installed outdoors or in facilities within the districts placed under the jurisdiction of the administration. Reporting information such as information associated with a disaster is wirelessly broadcast from the center station equipment to these terminal station devices. The reporting information received at each terminal station device is output from the speaker with loud voice. In a general broadcast wireless system, reporting information has been wirelessly sent from the center station equipment to plural terminal station devices in a single direction.

Furthermore, a character-sending function ancillarily equipped to a broadcast wireless system is a function of wirelessly broadcasting character messages as reporting information about information associated with a disaster or the like to terminal station devices. They are used for reconfirmation of the contents of already reported voice messages or for reporting directed to hearing impaired persons. In particular, in the center station equipment, a human server enters character messages to be reported as text to thereby acquire character information. The character information is routed to a wireless transceiver. Then, the character messages are delivered among the center station equipment and terminal station devices by making use of broadcast wireless lines. Furthermore, the delivery may be done in real time.

As for the character-sending function, a character-sending device for sending character information by entering text as character messages is installed, for example, in the center station equipment. A character display device for receiving the character information and displaying the information on a character message display portion is installed at each terminal station device. The character-sending function is accomplished by sending character information between the center station equipment and each terminal station device by making use of broadcast wireless communications.

A voice-synthesizing function ancillarily equipped to a broadcast wireless system is to read out text data as analog voice if the contents of a human server's report are entered as text data when the server executes voice reporting in the center station equipment. Such a voice-synthesizing function is used, for example, when a server who is unaccustomed to reporting businesses performs announcing businesses by proxy, using human voice.

Specifically, when the voice-synthesizing function is used, the server previously creates text data as sentences that organize the contents of planned reporting using human voice and, when the reporting is done, the text data is entered into the functional portion. Consequently, analog voice is synthesized and output.

In addition, a voice synthesizer that can be used in a broadcast wireless system needs to output high-quality analog voice which can be heard by a hearer of voice reporting, especially outdoors or indoors, such that he or she does not misrecognize the contents of the report. The requirement has been realized by a server type in the past. With this server type, high spec hardware is required and, therefore, the system is expensive. For this reason, the voice synthesizer has been installed only in the center station equipment.

Frequently, a subsystem utilizing a broadcast wireless line is added to a broadcast wireless system. For instance, a telemeter system is taken as an example. In particular, a telemeter-acquiring master station device is installed in center station equipment. A telemeter-acquiring slave station device is installed at each terminal state device. Telemeter information acquired by the telemeter-acquiring slave station devices is sent to the telemeter-acquiring master station device through broadcast wireless lines. Where the acquired telemeter information is a value that might be a factor causing a disaster, the center station equipment executes the reporting with loud voice while taking account of the factor. This previously induces inhabitants in the district to pay attention. Sometimes or frequently, an instruction such as an evacuation order may be issued.

FIG. 9 shows an example of configuration of digital broadcast wireless system.

It is to be noted that constituent parts roughly identical with those shown in FIG. 1 and associated with an embodiment of the present invention (described later) are indicated by the same symbols but that it is never intended that the present invention be limited thereby.

In the digital broadcast wireless system shown in FIG. 9, there are center station equipment E, plural terminal station devices F1-Fn, and plural receivers G1-Gm for individual homes.

The center station equipment E has a base station wireless transceiver 1 having a control portion 11, a wireless portion 12, and an antenna 13 and acting to perform wireless communications, a console 2 manipulated by a person and receiving various instructions and so on, a character-sending device 3 manipulated by a person to enter character messages and to activate transfer of characters, a voice synthesizer 91 for creating and outputting analog voice from the character messages instead of human voice, and a telemeter-acquiring master station apparatus 4 for asking telemeter-acquiring slave station devices 26 of the terminal station devices F1-Fn for telemeter information and collecting telemeter information from the telemeter-acquiring slave station devices 26.

Each of the terminal station devices F1-Fn has a terminal station body device 21 having a control portion 31, a wireless portion 32, and an antenna 33 and acting to perform wireless communications, a connection box 22 being an interface for connecting the terminal station body device 21 with other constituent parts 23, 24, 26, a trumpet speaker 23 for producing voice to persons, a display device 24 for displaying an image such as character information for persons, and a telemeter-acquiring slave station device 26 for detecting external information.

Each of the receivers G1-Gm for individual homes is equipped with a display device 41 for displaying an image such as character information.

Patent reference 1
Patent Publication No. U.S. Pat. No. 3,310,387
Non-patent reference 1: "Municipal Digital Broadcast Communication System (in Japanese)", ARIB STD-T86, Association of Radio Industries and Businesses

DISCLOSURE OF THE INVENTION

In a digital broadcast wireless system as described above, in a case, for example, where voice report and character report having the same report contents are made at the same time, a human server changes the contents of the character report into text prior to start of the reporting and creates character messages that can be displayed on the display device 24 connected with the terminal station devices F1-Fn. Then, if the server activates loudly uttered reporting, the previously created character messages are sent out by the character-sending function simultaneously or substantially simultaneously with voice reporting using human voice or before or after the voice reporting.

However, in this configuration, at the time of an urgent disaster or the like at which the digital broadcast wireless system is utilized most, it is necessary to execute the aforementioned complex procedure of operations. Therefore, there is the problem that simultaneous communication of rapid voice reporting and character reporting cannot be accomplished.

Furthermore, at the time of an urgent disaster or the like, there is a possibility that a human server who is routinely accustomed to reporting businesses does not execute loudly uttered reporting. Therefore, it has been necessary to realize a reporting procedure that can be easily manipulated even by a human server unaccustomed to reporting businesses. Furthermore, it has been necessary even for a human server unaccustomed to reporting businesses to realize announcing businesses with a high degree of clarity of voice.

Furthermore, in the broadcast wireless system as described above, only one line can be set up at a time for wireless lines a1 and a2 for loudly uttered reporting between the center station equipment E and terminal station devices F1-Fn. It is impossible to perform other communications simultaneously with voice reporting. In the past, where voice reporting and character reporting are carried out simultaneously, a human server who makes reports previously creates the contents of the reports as text data. Then, the server executes voice reporting. Almost simultaneously with voice reporting or in a sequential manner as a next report, the server activates character reporting and sends it.

Under circumstances where it is necessary to modify the contents of the report frequently and to execute loudly uttered reporting, the center station equipment E must carry out the loudly uttered reporting whenever the equipment detects a variation. In a case where reporting using character messages is performed simultaneously with the loudly uttered reporting, the human server must create character messages each time. For example, where a subsystem such as a telemeter system is connected, when the telemeter-acquiring slave station device 26 connected with the terminal station devices F1-Fn is measuring the water level information or the like about a river near the terminal station devices, it is necessary to offer precise information and convey instructions to inhabitants in a corresponding manner to information source producing a measurement value that varies from instant to instant due to the amount of rainfall. In the past, whenever a variation is detected, a human server must execute loudly uttered reporting by creating character messages in the center station equipment E.

Moreover, various kinds of reports such as voice reports and character reports need to be sent with loud voice and with reporting contents appropriate for each individual regional inhabitant, and the contents of reporting may be different for each different one of the areas served by the terminal station devices F1-Fn. Under these circumstances, in the past, the loudly uttered reporting needs to be carried out repeatedly as many times as there are different terminal station devices F1-Fn. However, it is only possible to set up one wireless line at a time and so a long time has been taken from the instant when loudly uttered reporting is carried out for all the terminal station devices F1-Fn to the instant when the reporting is ended.

Additionally, for example, in a disaster radio system, information about a location where a disaster has occurred is required to be collected quickly. Furthermore, information about a countermeasure method is required to be notified quickly. In a broadcast wireless system, too, unidirectional delivery function from the center station equipment E toward the plural terminal station devices F1-Fn is required. In addition, there is a demand for functions of collecting information acquired by the terminal station devices F1-Fn and offering precise reports to inhabitants in various regions by making effective use of limited wireless lines.

In view of these prior-art circumstances, the present invention has been made. It is an object of the invention to provide a wireless communication system or the like which, when center station equipment and slave station devices (e.g., terminal station devices or receivers for individual homes) communicate wirelessly, the slave station devices can do effective reporting.

To achieve the above-described object, in a wireless communication system associated with the present invention, the following processing is performed in a configuration in which center station equipment and slave station devices communicate wirelessly.

That is, in the center station equipment, sending means wirelessly sends character message information to be processed by the slave station devices to the slave station devices.

Each of the slave station devices has one or both of storage means and acquisition means. The storage means stores information used for the processing. The acquisition means acquires information used for the processing.

At each of the slave station devices, receiving means receives the aforementioned character message information. Processing means processes the received character message information using one or both of information stored in the storage means and information acquired by the acquisition means. Reporting means reports the contents of character message information created by the processing. The reporting is done by one or both of voice and characters.

Accordingly, after character message information sent from the center station equipment is received by the slave station device, the information is processed at the slave station device using stored or acquired information. Since the contents of the processed character message information are reported, the slave station device can do effective reporting.

In particular, information processed by the slave station device can be reported instead of, for example, raw information sent from the center station equipment, and therefore, various kinds of information can be flexibly created on the side of the slave station device and reporting can be done.

Character message information to be processed and sent to the slave station device from the center station equipment and the method of processing the character message information at the slave station device may assume various aspects.

One usable example of the aspects is as follows. Character message information having character portions which are to be added and which are filled blanks or the like is sent by the center station equipment. The slave station device performs processing consisting of adding characters to the character portions which are to be added and which are possessed by the character message information.

Another example of aspect available is as follows. The center station equipment gives an instruction as to the method of processing to the slave station device. Alternatively, a method of processing is set into the slave station device.

Based on this, the slave station device processes the received character message information.

A further example of aspect available is as follows. The slave station device stores the correspondence between identification information such as a number and the contents of a character message. The center station equipment sends the identification information to the slave station device. The slave station device creates (i.e., processes the identification information into character message information) information about the contents of the character message corresponding to the received identification information.

Furthermore, various kinds of information may be used as information used for processing at the slave station device. For example, fixedly set information may be used. Alternatively, information (information about variables) varying with the passage of time may be used.

The storage means may be built, for example, using a memory for storing information.

The acquisition means can be built, for example, using a function of acquiring information detected by a telemeter or the like from the telemeter or the like or using its own function of detecting information.

Means for outputting the contents of character message information by means of voice can be built, for example, using a speaker.

The means for outputting the contents of character message information by means of characters can be built, for example, using a display device having a display screen.

One example of configuration of a wireless communication system associated with the present invention is constructed as follows.

That is, at the slave station device, the voice-synthesizing means creates analog voice corresponding to the contents of the created character message information by voice synthesis. The reporting means outputs the created analog voice.

Therefore, information about characters can be sent from the center station equipment to the slave station device. At the slave station device, analog voice corresponding to the characters or processed characters can be output. Therefore, the amount of communication can be reduced compared with, for example, the case where information about analog voice is wirelessly communicated. Time and electric power required for communication can be reduced. Furthermore, the slave station device can make both report using characters and report using voice simply by sending only character message information from the center station equipment to the slave station device.

One example of configuration of a wireless communication system associated with the present invention is constructed as described below.

That is, in the slave station device, fold-back sending means sends (fold-back transmission) the contents of the created character message information to the center station equipment wirelessly. The transmission is performed with one or both of voice and characters.

In the center station equipment, the fold-back receiving means receives the contents (one or both of voice and characters) sent in a folded back manner, and fold-back output means outputs the contents (one or both of voice and characters) received in a folded back manner.

Accordingly, the contents of the character message information created at the slave station device or the contents output after the creation are sent to the center station equipment in a folded back manner. In the center station equipment, a person can confirm the contents or the contents can be automatically confirmed by a predetermined method.

A usable example of information folded back from the slave station device to the center station equipment is voice information obtained by outputting, in terms of voice, the contents of character message information created, for example, at the slave station device and collecting the output contents by a microphone. Another usable example is voice information which is obtained by converting the contents of character message information created at the slave station device into voice but which is not yet output. A further usable example is character information or the like indicating the contents of character message information created at the slave station device.

For example, in the configuration where voice output is collected at a slave station device and folded back or in the configuration where character output is photographed at the slave station device and folded back, what is actually output is folded back and so the reliability of the inspection can be improved.

Where there are plural slave station devices for a single center station apparatus, information folded back may be sent, for example, from two or more slave station devices at the same time. Alternatively, information folded back may be sent only from a single slave station device at the same instant of time using group communication, token control, or the like.

One example of configuration of a wireless communication system associated with the present invention is constructed as follows.

That is, the character message information wirelessly sent from the center station equipment or apparatus is received by the plural slave station devices.

Information stored in the storage means of each of the slave station devices or information acquired by the acquisition means includes information intrinsic to each of the slave station devices.

Accordingly, where the same character message information is sent from the center station equipment to the plural slave station devices, each slave station device is informed of information that has been processed using information intrinsic to it. Therefore, each slave station device can do very effective reporting.

Various kinds of information can be used as information intrinsic to each slave station device. For example, information about the names of the slave station devices, information about the names of the districts served by the slave station devices, information about the names of the subjects such as rivers managed by the slave station devices, information about instructions or the like regarding the regions or locations where the slave station devices are installed, and information or the like acquired either by telemeter apparatus connected with the slave station devices, respectively, or by telemeter function or the like incorporated in the slave station devices can be used.

In a method of wireless communication associated with the present invention, when center station equipment and slave station devices communicate wirelessly, the following processing is performed.

That is, the center station equipment wirelessly sends character message information to the slave station devices.

The slave station devices receive the character message information, process the received character message information using one or both of stored information and acquired information, and report the contents of character message information which has been created by the processing.

Therefore, in the slave station devices, effective reporting can be done.

In the center station equipment associated with the present invention, in the configuration where the equipment communicates with slave station devices wirelessly, the following processing is performed.

That is, sending means wirelessly sends character message information including information commanding processing by means of the slave station devices to the slave station devices having one or both of a function of storing information used for the processing and a function of acquiring the information.

Therefore, character message information that can be effectively reported at the slave station devices can be sent from the center station equipment.

Various kinds of information can be used as the information which is included in the character message information and which commands processing by means of the slave station devices. For example, information indicating that information is to be processed, information indicating a method of processing information, or both of these two kinds of information can be used.

At a slave station device associated with the present invention, in a configuration where the device wirelessly communicates with center station equipment, the following processing is performed.

That is, receiving means receives character message information sent wirelessly from the center station equipment, using one or both of storing of information by means of storage means and acquisition of information by means of acquisition means. Processing means processes the received character message information, using one or both of information stored in the storage means and information acquired by the acquisition means. The reporting means reports the contents of the character message information created by the processing.

Accordingly, at the slave station device, effective reporting can be done.

BRIEF DESCRIPTION OF THE DRAWINGS

FIG. 4 is a diagram showing one example of character message.

FIG. 5 is a diagram showing one example of terminal station message table.

BEST MODE FOR CARRYING OUT THE INVENTION

Figure 1:
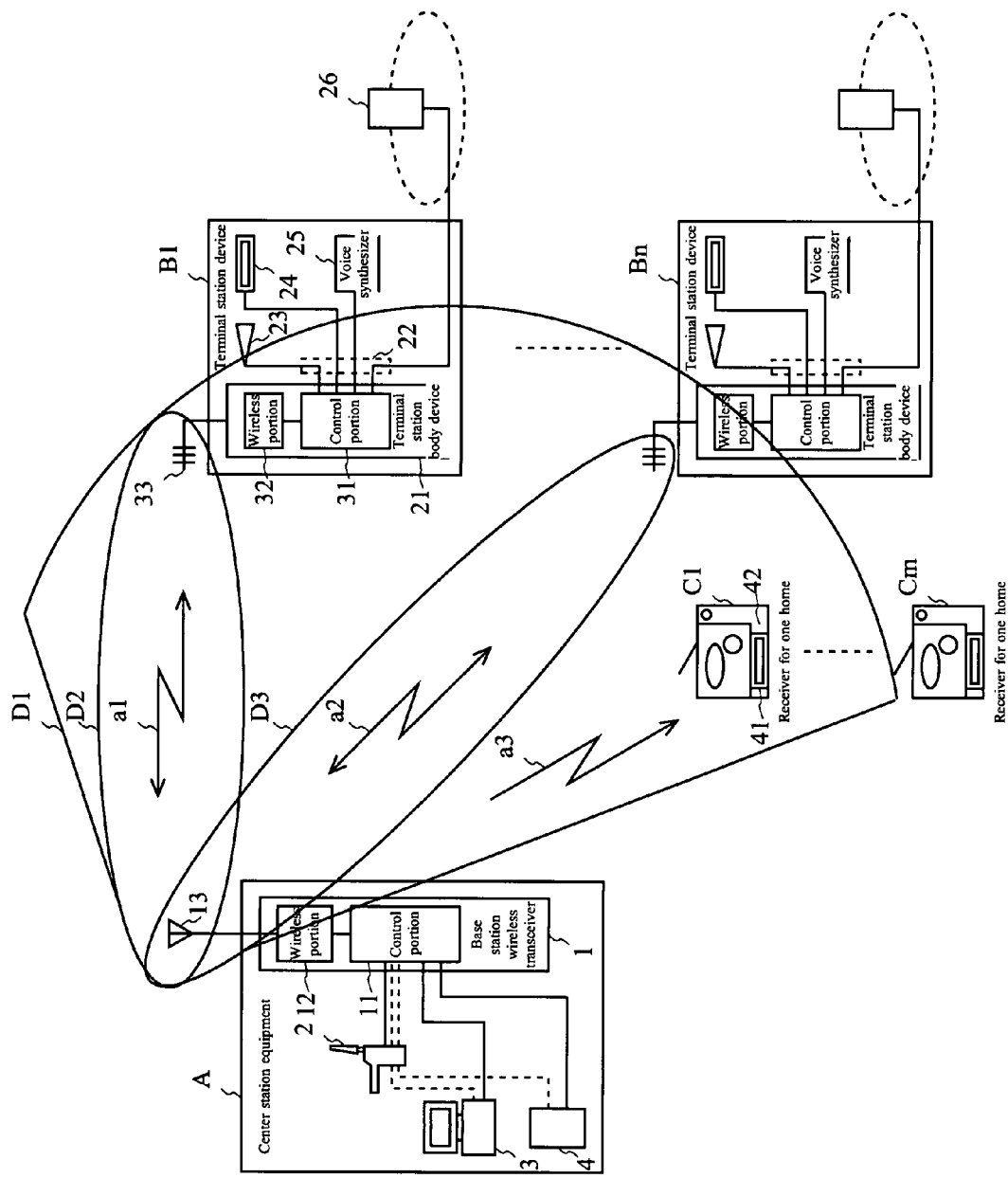
FIG. 1 is a diagram showing an example of configuration of a digital broadcast wireless system associated with an embodiment of the present invention.

Embodiments associated with the present invention are described with reference to the drawings.

In the present embodiment, a case is shown in which the present invention is applied to a digital broadcast wireless system that is a wireless communication system regarding municipal prevention of disasters.

The digital broadcast wireless system associated with the present embodiment is used, for example, in an application where disaster related information is reported from an administrative organ to inhabitants when a disaster has occurred.

Reported information which is wirelessly broadcast from the center station equipment is received by plural terminal station devices or the like installed in given locations and is output. As a specific example, a TDMA-TDD type (municipal digital disaster radio communication system in 60 MHz band (54 to 70 MHz)) digital broadcast wireless system for disaster preventive administrations has a function of doing reporting using character information or other coded information between the center station equipment and the terminal station devices or the like by making use of broadcast wireless lines. The system further includes functions including a function of creating and outputting analog voice for loudly uttered reporting from character information, other coded information, or the like.

In the digital broadcast wireless system associated with the present embodiment, when a disaster has occurred, for example, information associated with the disaster is reported to inhabitants from an administrative organ by broadcast communication. In particular, information about a disaster, information about emergent instructions, information about evacuation instructions, or the like is sent as voice information using conversations or non-voice information using character information or the like by a console installed in the center station equipment or by a base station wireless transceiver to terminal station devices and so on installed outdoors in various regions, general homes, meeting places, schools, and so on and conveyed to inhabitants.

Furthermore, at each terminal station device or the like, a character display device or other display device is connected or incorporated, and the terminal station device performs processing for displaying character information or the like received from the center station equipment onto a display device.

In addition, at each terminal station device or the like, a voice synthesizer is connected or incorporated, and the terminal station device performs processing for synthesizing and outputting analog voice based on character information received from the center station equipment, and outputs the synthesized and output analog voice with loud voice.

At the terminal station device or the like, various kinds of information may be used as the contents of voice report or the contents of displayed characters, as well as character information sent by the center station equipment. For example, information intrinsic to the terminal station device or the like, telemeter information acquired by a telemeter-acquiring slave station device or the like connected with a terminal station device or the like, and so on can be used.

Furthermore, the communication system can be applied, for example, to a fixed communication system in which terminal station devices are fixedly installed. Alternatively, the communication system may be applied to a communication system in which terminal station devices are movable such as cell phones. In the present embodiment, terminal station devices B1-Bn are installed at different region allocations. Receivers C1-Cm for individual homes are installed, for example, in individual homes or households in dwellings in cities, towns, or villages or carried by individual persons (owners).

Generally, the direction of communication from a base station unit (in the present embodiment, the center station equipment) toward a terminal station device or the like is referred to as the downstream direction. The direction of communication from a terminal station device or the like to the base station unit (in the present embodiment, the center station equipment) is referred to as the upstream direction.

An example of configuration of a digital broadcast wireless system associated with the present embodiment is shown in FIG. 1.

In the digital broadcast wireless system associated with the present embodiment, there are provided center station equipment A, n (plural) terminal station devices B1-Bn, and m (plural) receivers C1-Cm for individual homes. Various numbers may be used as the number n of the plural terminal station devices B1-Bn and as the number m of the plural receivers C1-Cm for individual homes.

Also shown in FIG. 1 are the communication region D1 of the center station equipment A, the communication region D2 of the terminal station device B1, the communication region D3 of the terminal station device Bn, a wireless line a1 between the center station equipment A and the terminal station device B1, a wireless line a2 between the center station equipment A and the terminal station device Bn, and a wireless line a3 between the center station equipment A and the receiver C1 for one home.

Furthermore, in the present embodiment, the terminal station devices B1-Bn are identical in configuration and operation. Therefore, symbols are attached to only the single terminal station device B1 and its configuration is shown. In addition, the receivers C1-Cm for individual homes are similar in configuration and operation. Symbols are given to only the single receiver C1 for one home and its configuration is shown.

In addition, in the present embodiment, the case where communications are made between the center station equipment A and the terminal station devices B1-Bn is chiefly described. For example, configuration and operation similar to the terminal station devices B1-Bn can also be applied to the receivers C1-Cm for individual homes.

The center station equipment A is equipped with a base station wireless transceiver 1, a console 2 manipulated by a person and receiving various instructions and so on, a character-sending device 3 manipulated by a person and acting to enter character messages and to activate transfer of characters, and a telemeter-acquiring master station apparatus 4 for asking the telemeter-acquiring slave station devices 26 of the terminal station devices B1-Bn for telemeter information and for collecting telemeter information from the telemeter-acquiring slave station devices 26. The transceiver 1 has a control portion 11, a wireless portion 12, and an antenna 13 and performs wireless communications.

Here, in the present embodiment, the character-sending device 3 is connected with the base station wireless transceiver 1. For example, it may be connected with the console 2. Character messages may be entered via the console 2 or transfer of characters may be activated via the console 2. Furthermore, equivalent functions may be accomplished by including the functions of the character-sending device 3 into the console 2.

Furthermore, in the present embodiment, the telemeter-acquiring master station apparatus 4 is connected with the base station wireless transceiver 1. For example, it may be connected with the console 2. Request for telemeter information may be made or telemeter information may be collected via the console 2. Furthermore, equivalent functions may be accomplished by incorporating the functions of the telemeter-acquiring master station apparatus 4 into the console 2.

Each of the terminal station devices B1-Bn has a terminal station body device 21 having a control portion 31, a wireless portion 32, and an antenna 33 and acting to perform wireless communications, a connection box 22 being an interface for connecting the terminal station body device 21 with other constituent parts 23 to 26, a trumpet speaker 23 for producing voice to persons, a display device 24 for displaying an image such as character information for persons, a voice synthesizer 25 for creating analog voice from character information or the like and outputting it, and a telemeter-acquiring slave station device 26 for detecting external information. If the voice synthesizer 25 assumes a form of an LSI, for example, reduced size and lower price can be accomplished with desirable results.

Here, in the present embodiment, the voice synthesizer 24 is connected as an external device of the terminal station device body 21. For example, a functional portion having functions equivalent to the voice synthesizer 24 can also be included inside (e.g., inside of the control portion 31 within the terminal station device body 21) the terminal station device body 21.

Each of the receivers C1-Cm for individual homes is equipped with a display device 41 for displaying an image such as about character information or the like and with a functional portion 42 having a voice-synthesizing function. If one in the form of an LSI, for example, is used as the voice-synthesizing function, reduced size and lower price can be accomplished with desirable results.

Here, in the present embodiment, a system configuration is shown in which plural terminal station devices B1-Bn and plural receivers C1-Cm for individual homes are directly connected to the center station equipment A via wireless lines a1-a3. For example, a system configuration equipped with relay devices may be used. The center station equipment A is connected with the plural terminal station devices B1-Bn and plural receivers C1-Cm for individual homes via the relay station devices.

Furthermore, in the center station equipment A of the present embodiment, a configuration for entering character massages as text may be used, for example. Alternatively, a voice recognition function may be introduced, and a configuration in which character messages for reporting is created from sentences (voice) read out by a human server may be used. That is, the center station equipment A of the present embodiment can send character information corresponding to inputting, whether the entered are characters or voice.

Embodiment 1

A first embodiment of the present invention is described.

In the present embodiment, a base station wireless transceiver 1 in center station equipment A connects terminal station devices B1-Bn, receivers C1-Cm for individual homes, and wireless lines a1-a3. When a loudly uttered report is transmitted by voice information, voice information obtained by converting analog voice into digital voice information by a voice codec is not directly transmitted by a wireless line. Rather, to transmit voice information, character information obtained by converting analog voice into character messages is transmitted instead. If it is character information, it can be sent with a less amount of information than voice information. Therefore, effective utilization of the wireless line can be accomplished. The substantial time taken to transmit voice information can be shortened. Furthermore, decrease in the transmission time leads to a decrease in the electric power consumed by the wireless device.

The terminal station devices B1-Bn and home-dedicated receivers C1-Cm receiving character information obtain analog voice for loudly uttered reporting by the use of the voice synthesizer 25 having a function of deriving voice information in the form of character messages from the character information.

One example of processing of such broadcast communication is shown.

Figure 2:
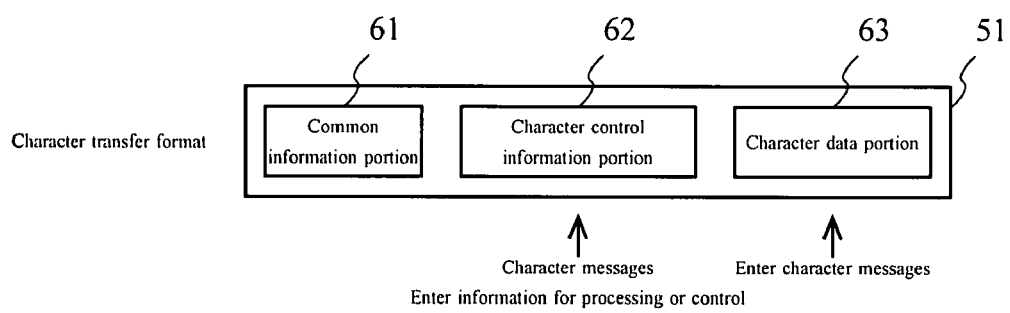
FIG. 2 is a diagram showing one example of data format used for transmission of characters.

One example of data format used in character transfer in the present example of digital broadcast wireless system is shown in FIG. 2.

The present example of character transfer data format 51 is created by the character-sending device 3 of the center station equipment A or by the console 2 either by automated operation of an automatic program-sending device or the like incorporated in the console 2 inside the center station equipment A or by a manipulation of a human server.

The present example of character transfer data format 51 is made up of a common information portion 61 (between different manufacturers), a character control information portion 62, and a character data portion 63.

In particular, the common control portion 61 is header information about character transfer telegraphic messages.

In the present embodiment, the character control information portion 62 is an area for entering the contents to be processed at the terminal station devices B1-Bn and so on regarding the contents of the character data portion 63. For example, information about processing for converting character messages into voice information or information for control of loudly uttered output is entered. Alternatively, for example, information about processing for directly converting character information into information for character display or information which is used for control and which clearly sets forth of a method of displaying on a display device may be entered into the character control information portion 62.

The character data portion 63 is the character message body.

Character information obtained by entering these pieces of detailed information 61-63 into the character transfer data format 51 are sent to the plural terminal station devices B1-Bn or the like through wireless lines from the center station equipment A.

Figure 3:
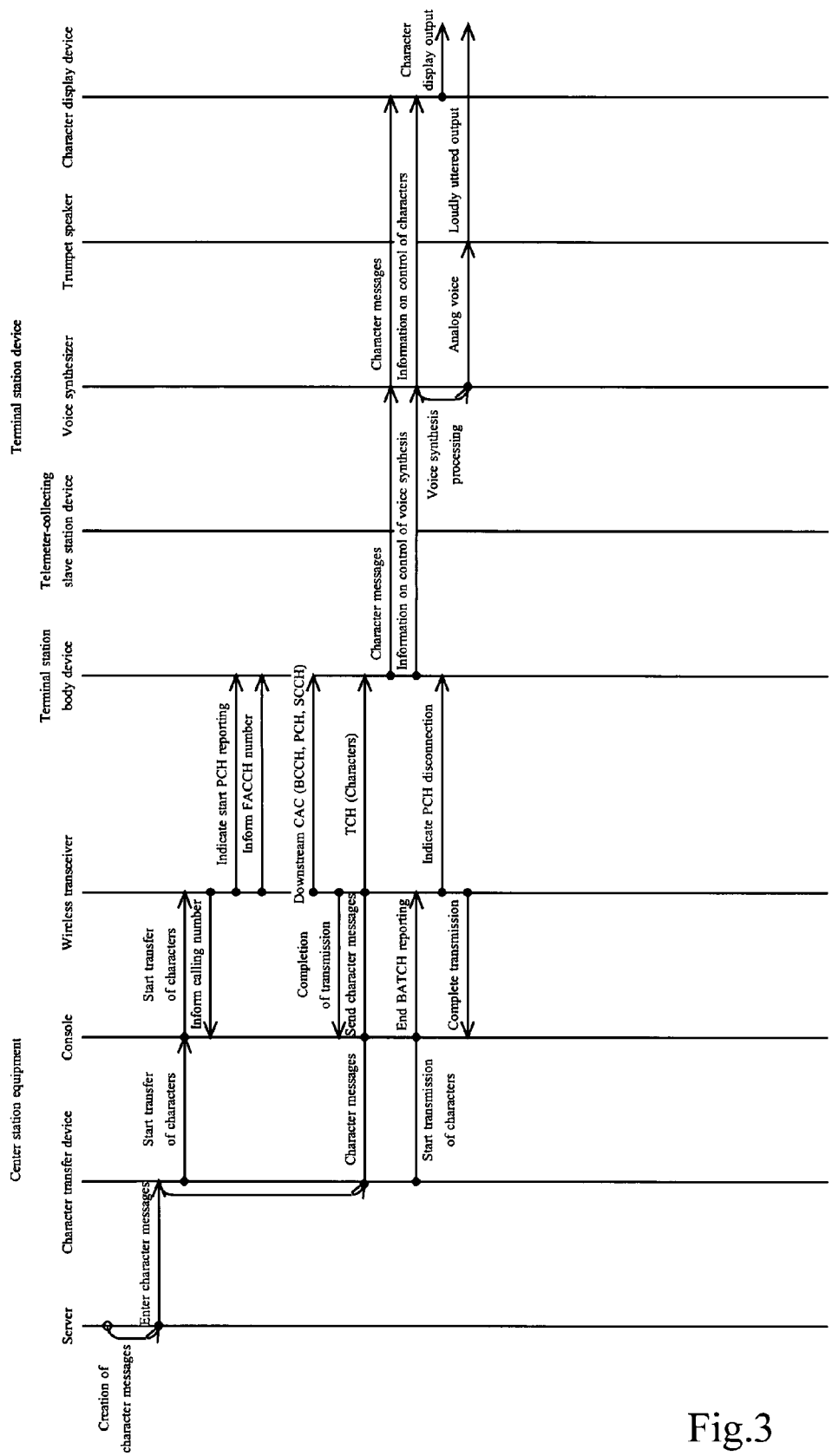
FIG. 3 is a diagram showing one example of processing for performing loudly uttered reporting from center station equipment to terminal station devices.

One example of a sequence of processing steps for doing loudly uttered reporting from the side of the center station equipment A to the terminal station devices B1-Bn and so on in the present example of digital broadcast wireless system is shown in FIG. 3.

First, in the center station equipment A, a human server, the automatic program-sending apparatus within the center station equipment A, or the like creates character messages representing sentences of the contents of loudly uttered reporting. In one available method of creating character messages by a human server, characters are directly keyed in by the server. In another method not using such entry from a keyboard, character messages are automatically created from sentences that are read out vocally by a human server using a voice synthesizer, thus alleviating server's manipulations. It is now assumed that character messages are entered into the character-sending device 3.

When character messages are entered, the character-sending device 3 creates character information by adding either control information necessary to synthesize analog voice by the voice synthesizer or control information necessary for display on the display device to the character messages. In the present example, such processing for adding the control information is performed by the character-sending device 3. For example, a human server who activates reporting may manually add the control information.

After the character information has been created, the console 2 of the center station equipment A outputs telegraphic messages to the base station wireless transceiver 1 in the same station to indicate that loudly uttered reporting is activated. Wireless lines a1-a3 are set up between the center station equipment A and the terminal station devices B1-Bn and so on. Character information is sent from the center station equipment A to the terminal station devices B1-Bn and receivers C1-Cm for individual homes through the wireless lines a1-a3. In these information communications, as shown in FIG. 3, a signal indicating start of PCH reporting, a signal notifying an FACCH number, signals for downstream CAC (e.g., BCCH, PCH, and SCCH), a signal about TCH (in the present example, character information), and a signal indicating disconnection of PCH are communicated.

Consequently, the terminal station devices B1-Bn and receivers C1-Cm for individual homes receive character information from the center station equipment A by a receiving function.

At the terminal station devices B1-Bn, after reception of character information, character message body and control information necessary for voice synthesis are extracted from the received character information and routed to the voice synthesizer 25. The voice synthesizer 25 synthesizes analog voice from the received data and outputs it, and outputs it as voice from the trumpet speaker 23. Similar operations are performed at the receivers C1-Cm for individual homes.

At the terminal station devices B1-Bn and so on, processing for synthesizing analog voice for loudly uttered reporting from the character information received as described above and outputting it is performed. Furthermore, processing for outputting character reporting messages for character display is performed, for example, using the received character information.

Where voice reporting and character reporting are carried out at the same time in this way, it is necessary, for example, that the voice reporting message and character reporting message be created with the same contents. Usually, voice reporting messages and character reporting messages are often different in literary style.

Accordingly, the center station equipment A sends character messages adapted for character reporting as an example. When voice reporting is done, control information indicating that the sentences are so modified that the character messages can be output optimally for voice reporting may be added. Alternatively, character messages adapted for voice reporting may be sent, and during character reporting, control information may be added to indicate that the sentences are modified in such a way that the character messages can be output optimally for character reporting.

At the terminal station devices B1-Bn and so on, in a case where character information including character messages and control information is received, processing for causing the character messages to be processed such that they can be output optimally for display devices 24 and 41 is performed according to the control information. Alternatively, the character messages are processed into sentences optimal for voice reporting and sent to the voice synthesizer 25.

In this way, in the present example, character reporting and voice reporting can be carried out at the same time. Therefore, even in a case where character reporting and voice reporting are carried out, the human server of the center station equipment A is only required to perform processing for manipulating character reporting. Consequently, server's manipulations are facilitated. Furthermore, it is possible to offer loudly uttered reporting of high quality with a high degree of vocal clarity not affected by the skill of the server.

As described so far, in the present example of digital broadcast wireless system, the center station equipment A and the plural terminal station devices B1-Bn and so on are wirelessly connected. Alternatively, the center station equipment A and the plural terminal station devices B1-Bn and so on are wirelessly connected via relay station devices. When reporting information broadcast from the center station equipment A is received by the terminal station devices B1-Bn and so on and output, the following configuration is assumed.

That is, devices having a voice-synthesizing function are connected to the sides of the terminal station devices B1-Bn and so on instead of the side of the center station equipment A or functional portions having a voice-synthesizing function are mounted. In the center station equipment A, character information is sent. At the terminal station devices B1-Bn and so on, the character information is received. The character information is converted into information that can be output to display devices, and is output. Analog voice is created from the character information and is output.

Therefore, in the present example of digital broadcast wireless system, the side of the terminal station devices B1-Bn and so on can output voice reporting or voice reporting and character reporting simultaneously only if the human server simply creates character messages such as text data in the center station equipment A. Consequently, when voice or characters are reported with loud voice, the duty cycle of the wireless line can be reduced greatly. As a result, the transmission time and the amount of communication can be reduced, which in turn permits a decrease in the power consumption. Hence, the wireless networks can be effectively utilized. In the center station equipment A, even where character reporting and voice reporting are carried out simultaneously, for example, the procedure of activation effected for manipulations of a human server is facilitated. Furthermore, it is not necessary for the server to do reporting directly by his or her own voice. Therefore, it is easy even for a server who is unaccustomed to announcing businesses to create the contents of reporting. It is possible to do voice reporting without error with a high degree of vocal clarity. In this way, very great advantages can be obtained when disaster preventive measures are taken.

Embodiment 2

A second embodiment of the present invention is described.

In the present example of digital broadcast wireless system, prior to voice reporting or character reporting, the following information is added to character transfer data format 51 created in the center station equipment A.

That is, in the present example of character transfer data format 51, in a case where character messages are entered into the character data portion 63, a notice to the effect that there is information to be additionally entered to the terminal station devices B1-Bn or receivers C1-Cm for individual homes is added to the sentences of the character messages as an example. As a further example, in the center station equipment A, either processing information in which items to be carried out additionally by the terminal station devices B1-Bn or receivers C1-Cm for individual homes to the character messages of the character data portion 63 are described or control information is entered into the character control information portion 62 and sent to the terminal station devices B1-Bn and so on. At the end terminal devices B1-Bn and so on, the character messages are modified based on the information portion, the processing information, or the control information included in the received character information, and voice reporting or character reporting is output. Alternatively, after performing processing for acquiring necessary information, the character messages are modified, and voice reporting or character reporting is output.

One example of processing of such broadcast communication is shown.

Shown in FIG. 4 is one example of character message 71 used for character transfer in the present example of digital broadcast wireless system, i.e., a message, "This is (information portion b1). The water level (at the information portion b2) has just reached (information portion b3) Everyone in district (information portion b4) is (information portion b5)".

The character message 71 is created by the character-sending device 3 or the console 2 of the center station equipment A either by a human server's manipulations or by automated operation of the automatic program-sending device or the like incorporated in the console 2 within the center station equipment A.

The contents of the character message 71 shown in FIG. 4 show an example in which information intrinsically set in the terminal station devices B1-Bn and so on or information about the telemeter system monitoring the water level of a river is used for loudly uttered reporting.

In particular, the present example of character message 71 has areas (information portions) b1-b5 for which information needs to be additionally entered into various locations within sentences.

The information portion b1, the information portion b2, and the information portion b4 are areas for entering information (terminal station intrinsic information) intrinsic to the terminal station devices B1-Bn and so on. These specified portions are an area for entering information about the names (terminal station names) of the terminal station devices B1-Bn and so on, an area for entering information about the name of a river, and an area for entering information about the names of the served districts, respectively.

The information portion b3 is an area specified to enter information (in the present example, water level information) detected by the telemeter-acquiring slave station device 26 from the side of the terminal station devices B1-Bn.

The information portion b5 is an area specified to enter information about fixed phrases. In the present example, fixed phrases frequently used are previously registered in the terminal station devices B1-Bn and so on. A fixed phrase to be entered into the information portion b5 is judged according to an instruction (e.g., a number or the like for identifying the fixed phrase) from the center station equipment A or according to telemeter information or the like collected by the terminal station devices B1-Bn.

One example of message table (terminal station message table) set and stored in the memory or the like of each of the terminal station devices B1-Bn or the like is shown in FIG. 5.

In the present example of terminal station message table, multiple kinds of character information and so on are set. These include: character information "disaster preventive stations A and B" that is intrinsic information 1 to be entered into the information portion b1; character information "river C" that is intrinsic information 2 to be entered into the information portion b2; character information "town D" that is intrinsic information 3 to be entered into the information portion b4; identification information "water level indicator at point E in river C" for identifying the telemeter-acquiring slave station device 26 for acquiring terminal station telemeter information 1 to be entered into the information portion b3; identification information "water level indicator at point F in river C" corresponding to terminal station telemeter information 2, character information "Please keep off the river" that is terminal station fixed phrase information (1) to be entered into the information portion b5 or character information "Please gather round at meeting place G" that is other fixed phrase information (2); and character information "Please evacuate quickly" that is further fixed phrase information (3).

Figure 6:
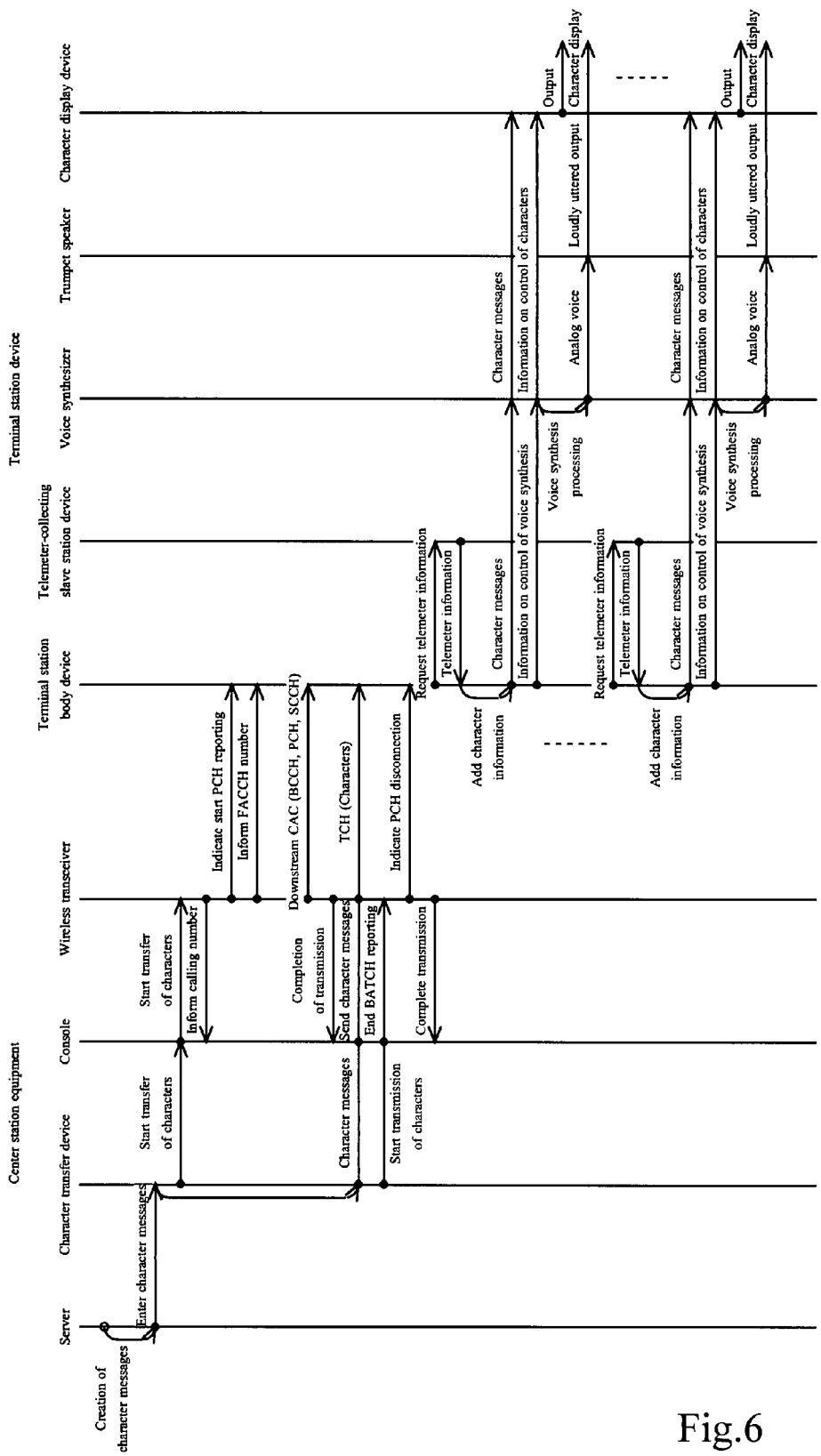
FIG. 6 is a diagram showing one example of processing for performing loudly uttered reporting from center station equipment to terminal station devices.

FIG. 6 shows one example of a sequence of processing steps for doing loudly uttered reporting from the side of the center station equipment A to the terminal station devices B1-Bn and so on in the present example of digital broadcast wireless system.

First, in the center station equipment A, the human server or the automatic program-sending device or the like within the center station equipment A creates character messages 71 obtained by forming sentences from the contents of the loudly uttered reporting as shown in FIG. 4. The character messages 71 are sent as character information to the terminal station devices B1-Bn and so on through wireless lines. The terminal station devices B1-Bn and so on receive the character messages 71 from the character information and then analyze the character information once received without immediately carrying out voice outputting or character outputting. They analyze as to whether there is any information to be added to the terminal station devices B1-Bn and so on or analyze as to whether there is any information such as telemeter information that must be acquired from an external device such as the telemeter-acquiring slave station device 26 or the like and be added. As a result of the analysis, in a case where such processing becomes necessary, the terminal station devices B1-Bn and so on perform processing for adding the information to be added before loudly uttered reporting.

In the present example, each of the terminal station devices B1-Bn and so on stores the terminal station message table 81 set for each station itself into the memory. Various kinds of information are added to the information portions b1-b5 within the character messages 71. These kinds of information include terminal station names referred to as terminal station intrinsic information 1, telemeter information 1 being the water level measured by the telemeter-acquiring slave station device 26, and information about instructions (fixed phrases) given to inhabitants, the instructions being determined by judging the telemeter information 1. The additional information by the terminal station devices B1-Bn and so on is different among the areas under jurisdiction of the terminal station devices B1-Bn and so on. Therefore, the contents of reporting can be modified optimally for each of the terminal station devices B1-Bn and so on and loudly uttered reporting can be done with a single run of loudly uttered reporting by the center station equipment A.

The background behind which such modifications are made possible easily is that the contents of voice reporting that would have been difficult to modify at the terminal station devices B1-Bn and so on, for example, with reporting using analog voice are conveyed as character messages to the terminal station devices B1-Bn and so on. Because the contents are once created in terms of character messages, the contents of reporting can be data processed by the terminal station devices B1-Bn and so on.

Where messages whose contents of reporting vary frequently, for example, are reported with loud voice only to the terminal station devices B1-Bn and so on at certain locations by making use of this, it is possible to make effective use of the wireless lines. As an example, the terminal station devices B1-Bn and so on can perform loudly uttered reporting by using telemeter information or the like acquired by the telemeter-acquiring slave station device 26 in such a way that the information is used in a part of reporting from the center station equipment A. Therefore, it is only required for the center station equipment A to perform only one operation of loudly uttered reporting. If the contents of this portion varies frequently, it is only necessary for the sides of the terminal station devices B1-Bn and so on to vary the telemeter information or the like. This makes it unnecessary for the center station equipment A to do loudly uttered reporting directed to the terminal station devices B1-Bn and so on whenever a change is made.

Furthermore, for example, in the center station equipment A, a configuration is also possible in which only codes such as numbers and the like used instead of the contents of reporting are sent rather than the contents of reporting of loudly uttered reporting are directly sent and that any one of the terminal station devices B1-Bn and so on can select the contents of reporting to be done from its own station according to codes received from the center station equipment A by previously storing the contents of reporting corresponding to the codes in the terminal station message table 81. Consequently, the amount of data transmitted to the wireless lines can be reduced.

The electric power consumed by the wireless devices can be reduced by reducing the amount of transferred data as in them.

In addition, in a configuration like the present example, in a case, for example, where the operation of the center station equipment A stops and loudly uttered reporting from the center station equipment A to the terminal station devices B1-Bn and so on is disabled, a degenerate function is enabled. That is, automatic reporting using voice reporting can be done to the area served by the station itself, using information in the terminal station message table 81 stored in the station itself such as the terminal station devices B1-Bn and so on, telemeter information from the telemeter-acquiring slave station device 26 connected to the station itself, or other information. As one example, if the character messages 71 as shown in FIG. 4 are sent once to the terminal station devices B1-Bn and so on from the center station equipment A, reporting can be done plural times at the terminal station devices B1-Bn and so on, using a reporting mode such as the report timing complying with an instruction from the center station equipment A or conforming with the contents set in the terminal station devices B1-Bn and so on and the number of reports. Whenever a report is made, the portion such as telemeter information or the like can be updated.

At the terminal station devices B1-Bn and so on, even in local broadcasting, high-quality voice reporting with a high degree of vocal clarity not affected by the skill of the human server can be done.

Various kinds of information can be used as the telemeter information. For example, information about water level, amount of airflow, photochemical smog, earthquake, accumulation of snow, rainfall, result of monitoring using a monitor camera, and so on can be used. Furthermore, for example, values of telemeter information or the like can be sent from the terminal station devices B1-Bn and so on to the center station equipment A, and threshold values regarding them can be determined based on the values received by the center station equipment A. Additionally, a decision can be made as to what of regions having the terminal station devices B1-Bn and so on to which reporting is made are selected.

As described so far, in the present example of digital broadcast wireless system, an indication to the effect that intrinsic information possessed by the terminal station devices B1-Bn and so on and information obtained from an externally connected device or the like should be added by the terminal station devices B1-Bn and so on is described in the reporting information broadcast to the terminal station devices B1-Bn and so on by the center station equipment A. The terminal station devices B1-Bn and so on add information indicated by the center station equipment A to the received character information such that the information is reflected in the contents of reporting. The report is output. In the present example, the center station equipment A sends data about templates of reporting messages using characters, and the terminal station devices B1-Bn and so on add intrinsic information possessed by themselves, telemeter information, and other information to the templates. Messages created thereby are output as reports using voice or characters.

For example, in the center station equipment A, information indicating that information should be added by the sides of the terminal station devices B1-Bn and so on and control information for obtaining the information to be added are added to character information to be reported to the terminal station devices B1-Bn and so on. At the terminal station devices B1-Bn and so on, the character information is received. Where information to be added by the terminal station devices B1-Bn and so on is present in the character information, the information is output with loud voice after adding the information.

Furthermore, in the center station equipment A, control information for activating external devices such as telemeter system or the like installed in the terminal station devices B1-Bn and so on is added to character information and sent. At the terminal station devices B1-Bn and so on, the character information is received. Where control information indicating that the external device such as telemeter system or the like should be activated and measurements be made by the terminal station devices B1-Bn and so on is present in the character information, the external device such as telemeter system or the like is activated, and results of the measurements are acquired. The acquired results of measurements are added to the character information and output with loud voice.

Accordingly, in the present example of digital broadcast wireless system, contents of report optimal for inhabitants of regions served by the individual terminal station devices B1-Bn and so on can be offered by adding pieces of intrinsic information for the individual terminal station devices B1-Bn and so on and external information obtained by the terminal station devices B1-Bn and so on according to the contents of report. The contents of report can be made precise for individual regions. In the case of reports containing information about certain locations, and if the information varies frequently, the terminal station devices B1-Bn and so on can repeatedly do reporting independently without using wireless lines. Hence, a high functional communication system can be accomplished.

Embodiment 3

A third embodiment of the present invention is described.

In the present example of digital broadcast wireless system, idle wireless slots which are made inoperative by replacing loudly uttered reporting using voice by reporting using character transmission are noticed, and communications are performed using such idle wireless slots. In particular, wireless lines capable of sending voice data are established between the terminal station devices B1-Bn and so on and the center station equipment A. The center station equipment A can hear or monitor the contents of the loudly uttered reporting received by the equipment by sending the voice information reported with loud voice by the terminal station devices B1-Bn and so on to the center station equipment A in a folded back manner.

One example of processing of such a digital broadcast wireless system is shown.

Figure 7:
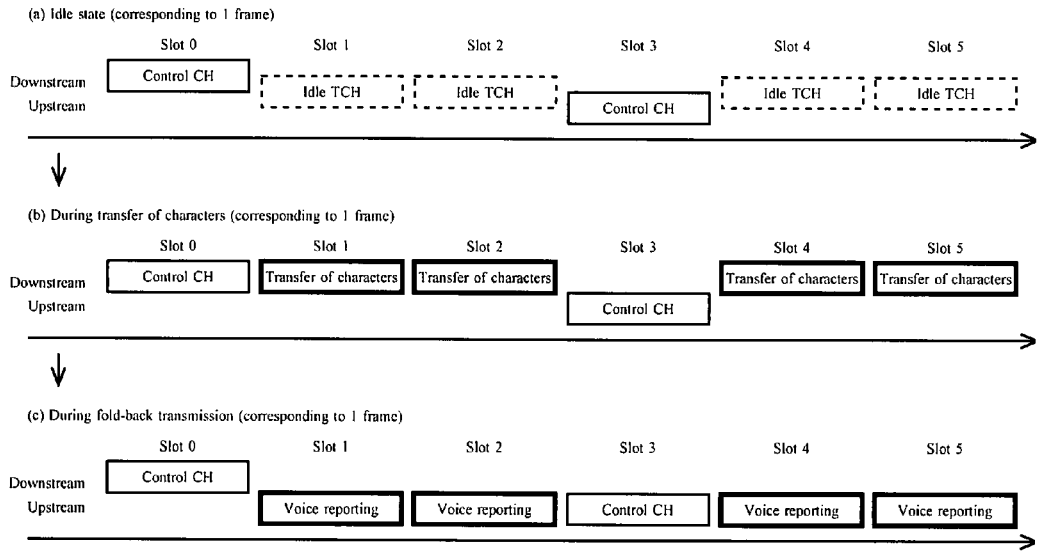
FIG. 7 is a diagram showing one example of circumstances of usage of a wireless network slot between center station equipment and a terminal station device.

One example of circumstances of usage of wireless network slots is shown in FIG. 7(*a*), (*b*), (*c*), the slots being used in wireless communications performed between the base station wireless transceiver 1 of the center station equipment A and the terminal station devices B1-Bn and so on in the present example of digital broadcast wireless system.

The circumstances of usage of wireless network slots corresponding to one frame under an idle state are shown in FIG. 7(*a*). The circumstances of usage of wireless network slots corresponding to one frame when characters are being sent from the center station equipment A to the terminal station devices B1-Bn and so on are shown in FIG. 7(*b*). The circumstances of usage of wireless network slots corresponding to one frame when the terminal station devices B1-Bn and so on are sending voice reporting or the like to the center station equipment A in a folded back manner during loudly uttered reporting are shown in FIG. 7(*c*).

In the present example, as shown in FIG. 7(*a*), during 1 frame, slot 0 (downstream control channel) used as a control slot for downstream lines from the center station equipment A to the terminal station devices B1-Bn and soon, slot 3 (upstream control channel) used as a control slot for the upstream lines from the terminal station devices B1-Bn and so on to the center station equipment A, and communication slots 1, 2, 4, and 5 are provided. Consequently, the number of slots necessary for voice reporting and character transfer is assigned from slots 1, 2, 4, 5 used as communication slots used during voice reporting or during non-voice communications such as character transfer or the like, and wireless communications are performed.

In the present example, as shown in FIG. 7(*b*), the center station equipment A assigns slots 1, 2, 4, and 5 (downstream communication channels) as communication slots used to send characters to the terminal station devices B1-Bn and so on.

Furthermore, as shown in FIG. 7(*c*), slots 1, 2, 4, and 5 (upstream communication channels) are assigned as communication slots used by the terminal station devices B1-Bn and so on to send the voice output or the like to the center station equipment A in a folded back manner during loudly uttered reporting.

Figure 8:
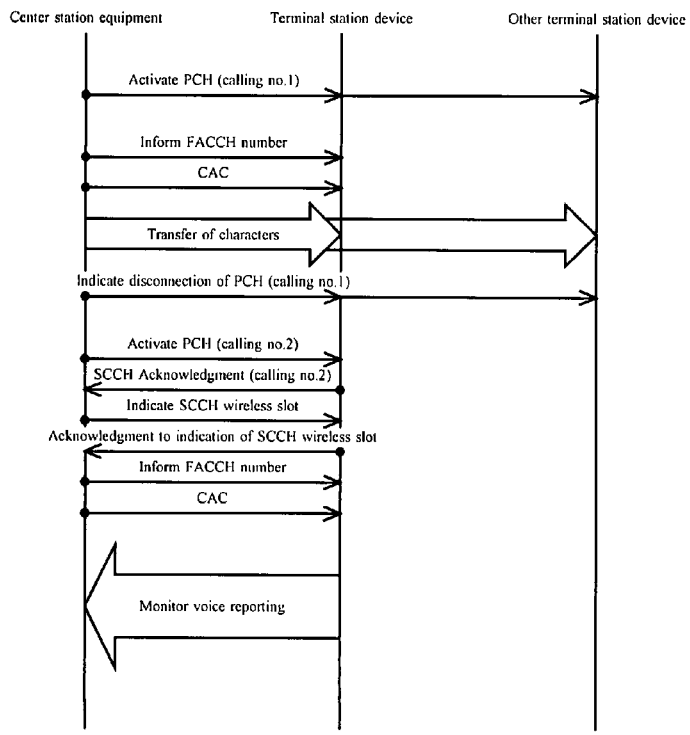
FIG. 8 is a diagram showing one example of procedure for setting up a wireless line between center station equipment and a terminal station device.
Figure 9:
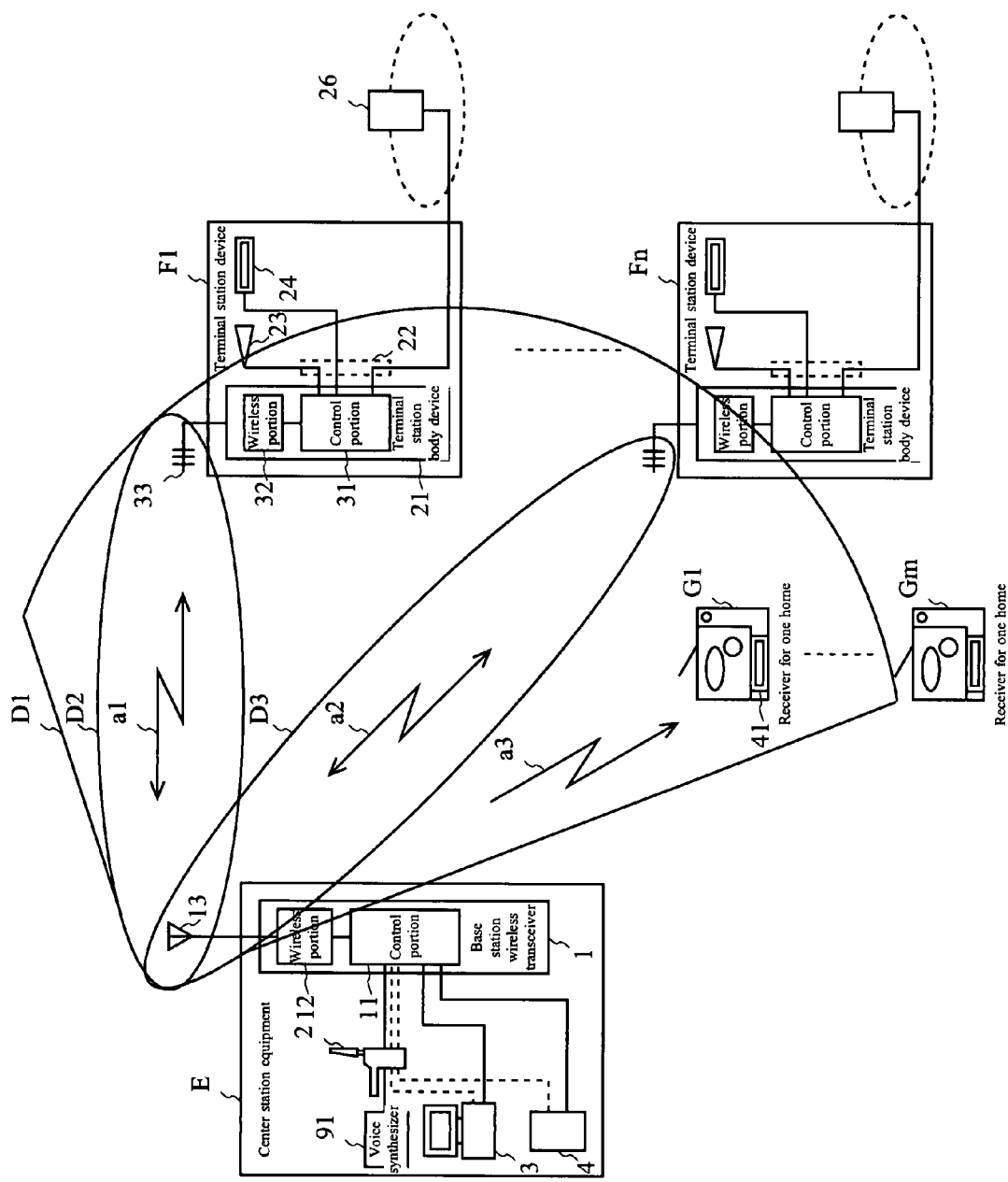
FIG. 9 is a diagram showing an example of configuration of a digital broadcast wireless system.

One example of procedure for setting up wireless lines between the center station equipment A and the terminal station devices B1-Bn and so on is shown in FIG. 8.

During transfer of characters, normal batch calling processing for character transfer is first performed to connect the wireless lines from the center station equipment A to the terminal station devices B1-Bn and so on. Under this condition, after transmission of character information, the wireless lines are once terminated.

Then, for example, before the terminal station devices B1-Bn and so on become engaged in loudly uttered reporting, normal calling processing is performed from the center station equipment A to the terminal station devices B1-Bn and so on, and the wireless lines are connected. By performing such processing, in the center station equipment A, wireless channels can be set up in which voice reporting to the station itself can be folded back and sent to the center station equipment A when the terminal station devices B1-Bn and so on are loudly reporting.

In this way, on the side of the present example of center station equipment A, the terminal station devices B1-Bn and so on can hear or monitor voice reports in real time during loudly uttered reporting in response to voice transmission of voice information or the like being loudly reported by the terminal station devices B1-Bn and so on by making use of slots 1, 2, 4, and 5, for example, by the function of the base station wireless transceiver 1. In this case, in the present example, there is a possibility that some delay is produced due to processing for fold-back transfer by wireless lines regarding voice information reported with loud voice by the terminal station devices B1-Bn and so on but the information can be conveyed to the center station equipment A almost in real time.

Furthermore, for example, the group communication function or token control function in the digital broadcast wireless system can also be utilized to establish wireless lines for sending voice reports or the like being reported with loud voice to the center station equipment A. As an example, in the center station equipment A, it is possible to select which ones of plural groups are used regarding the terminal station devices B1-Bn and so on by token control to hear or monitor the contents of reporting from the selected groups. Similarly, in the center station equipment A, in a case where loudly uttered reports are made to the plural terminal station devices B1-Bn and so on, a terminal station device can be selected from the plural terminal station devices B1-Bn to hear or monitor the loudly uttered report by folding back it, and the report can be heard or monitored.

In this way, in the present example of digital broadcast wireless system, upstream wireless channels are set up to communicate voice information or the like between the center station equipment A and the terminal station devices B1-Bn and so on. In the center station equipment A, the received voice report or the like can be heard or monitored by outputting the report to a speaker or the like and by sending the voice information or the like being reported with loud voice to the center station equipment A in a folded back manner by making use of idle wireless lines during loudly uttered reporting at the local stations of the terminal station devices B1-Bn and so on.

In the present example, a case has been shown in which the contents of voice reports or the like are sent to the center station equipment A in a folded back manner in real time during loudly uttered reporting of the terminal station devices B1-Bn and so on and the sent reports are heard or monitored in the center station equipment A. For example, using a similar procedure, the terminal station devices B1-Bn and so on can also send voice information or the like that is planned to be output with loud voice, already loudly output voice information, or the like to the center station equipment A in a folded back manner by activating the voice synthesizer and outputting analog voice before loudly uttered reporting is executed or after executed without outputting the analog voice with loud voice. If such a procedure is used, the center station equipment A can check the normality of the voice reporting before the terminal station devices B1-Bn and so on execute the loudly uttered reporting or after the loudly uttered reporting is executed.

As described so far, in the present example of digital broadcast wireless system, analog voice or the like which is created by arbitrary terminal station devices B1-Bn and so on and which is being output with loud voice is sent to the center station equipment A by using slots made idle (inoperative) during loudly uttered reporting by sending only character data from the center station equipment A. In the center station equipment A, the analog voice or the like is heard. In the center station equipment A, the contents of reports output with loud voice by the terminal station devices B1-Bn and so on can be heard in real time, for example. Alternatively, the contents of reports planned to be output with loud voice by the terminal station devices B1-Bn and so on can be heard prior to start of reporting, or the contents of reports for which the terminal station devices B1-Bn and so on have completed loudly uttered outputting can be heard after the end of reporting.

Accordingly, it is possible to check or assure on the side of the center station equipment A as to whether the contents of reports sent as character information from the center station equipment A to the terminal station devices B1-Bn and so on have been normally sent to the terminal station devices B1-Bn and so on, as to whether the contents have been normally processed at the terminal station devices B1-Bn and so on, as to whether the contents have been normally converted into analog voice by the terminal station devices B1-Bn and so on, and as to whether the contents have been normally output with voice by the terminal station devices B1-Bn and so on.

With respect to information folded back to the center station equipment A from the terminal station devices B1-Bn and so on, loudly uttered output, for example, from the trumpet speaker 23 may be collected with a microphone and folded back. Alternatively, the voice may be folded back before the loudly uttered output is output from the trumpet speaker 23 or processed character information may be folded back. As an example, in the center station equipment A, voice reports can be heard in real time by connecting microphones with the terminal station devices B1-Bn and so on or incorporating the microphones into them, collecting analog voice from within the loudly uttered output, and sending the collected analog voice to the center station equipment A. Furthermore, analog voice created by the terminal station devices B1-Bn and so on may be directly sent or otherwise operated to the upstream lines in a folded back manner without connecting microphones to the terminal station devices B1-Bn and so on.

Furthermore, for example, character information is previously sent from the center station equipment A to the terminal station devices B1-Bn and so on. The terminal station devices B1-Bn and so on can perform fold-back transmissions to confirm before reporting from the received character information as to whether normal analog voice can be output.

Further, in the center station equipment A, if the information is character information, for example, collation can be made if fold-back information has returned from all the terminal station devices B1-Bn and soon. However, where analog voice comes back in real time, hearing or monitoring can be made only with one or a few stations where a person hears or the network capacity is limited. Therefore, the system can be so designed that hearing can be made only with a typical station. For example, it is possible to previously determine terminal station devices B1-Bn and so on performing fold-back communications, or they can be determined at random. Alternatively, they can be determined in a given order such as the order of numbers assigned to the terminal station devices B1-Bn. As one example, the station at which character information from the center station equipment A is processed to a low or high degree can also be used as the typical station.

In addition, in the present example, different communication lines are set up between communications from the center station equipment A to the terminal station devices B1-Bn and so on and communications from the terminal station devices B1-Bn and so on to the center station equipment A, as shown in FIG. 8. For example, both communications of character information and fold-back communications can be performed by setting up bi-directional communication lines which can send and receive between the center station equipment A and the terminal station devices B1-Bn.

In the digital broadcast wireless system associated with the present embodiment shown so far, slave station devices for the center station equipment A are built by the terminal station devices B1-Bn and receivers C1-Cm for individual homes.

Furthermore, in the center station equipment A associated with the present embodiment shown so far, the sending means and the receiving means (fold-back receiving means) are constructed by the functions of the base station wireless transceiver 1. Fold-back output means for outputting fold-back information is constructed by the functions of the console 2 or the like.

In the terminal station devices B1-Bn associated with the present embodiment shown so far, storage means is constructed by the function of storing the terminal station message table 81 as shown in FIG. 5 into the memory. Acquisition means is constructed by the function of acquiring information about a water level by the telemeter-acquiring slave station device 26. Receiving means and sending means (fold-back sending means) are constructed by the functions of the terminal station body device 21. Processing means is constructed by the function of processing information about the character messages 71 as shown in FIG. 4. Reporting means is constructed by the function of making reports by the trumpet speaker 23 and display device 24. Voice synthesis means is built by the functions of the voice synthesizer 25.

Furthermore, the receivers C1-Cm used for individual homes and associated with the present embodiment shown so far may have all or some of the functions possessed by the terminal station devices B1-Bn. For example, storage means is constructed by the function of storing information into a memory. Receiving means and sending means are constructed by the function of performing wireless communications using an antenna. Processing means is constructed by the function of processing character message information. Reporting means is constructed by the functions of the display devices 41 and the functions of the speaker. Voice synthesis means is constructed by the voice-synthesizing function possessed by the functional portion 42.

The configurations of the wireless communication system, center station equipment, and slave station devices (in the present embodiment, terminal station devices and receivers for individual homes) associated with the present invention are not always limited to those shown so far. Various configurations may also be used. In addition, the present invention can be offered, for example, as a method or system of carrying out processing associated with the present invention, as a program for realizing such a method or system, or as a recording medium or the like for recording the program. Additionally, the invention can also be offered as various apparatus or systems.

Moreover, the field of application of the present invention is not always limited to those shown so far. The present invention can be applied to various fields.

Additionally, as for various kinds of processing performed in the wireless communication system, center station equipment, slave station devices (in the present embodiment, terminal station devices and receivers for individual homes), and so on associated with the present invention, structures which are controlled by a processor in hardware resources equipped, for example, with the processor, memories, and so on by executing a control program loaded in a ROM (read only memory) may be used. Furthermore, the structures may be constructed as a hardware circuit in which various functional means for implementing, for example, the processing are independent of each other.

Further, the present invention can also be grasped as a recording medium capable of being read by a computer such as a floppy (trademark registered) disc, CD (compact disc)-ROM, or the like in which the above-described control program is loaded or as the program (itself). Processing associated with the present invention can be carried out by entering the control program from the recording medium into the computer and causing the processor to execute the program.

INDUSTRIAL APPLICABILITY

As described so far, according to a wireless communication system or the like associated with the present invention, center station equipment wirelessly sends character message information that should be processed by slave station devices to the slave station devices. The slave station devices process the received character message information using stored information or acquired information, and report the contents of the character message information created by the processing. Consequently, the slave station devices can do effective reporting.

The invention claimed is:

1. A wireless communication system comprising a center station device and a plurality of slave station devices,
   wherein said center station device and slave station devices communicate wirelessly,
   wherein said center station device includes sending means for wirelessly sending information to be processed by said slave station devices to said slave station devices,
   wherein each of said slave station devices includes one or both of (i) storage means for storing information used for processing said information to be processed and (ii) acquisition means for acquiring information used for processing said information to be processed, receiving means for receiving said information to be processed, processing means for processing the received information using one or both of the information stored in said storage means and the information acquired by said acquisition means, and reporting means for reporting contents of information created by said processing means by means of one or both of voice and characters,
   wherein each of said slave station devices includes fold-back sending means for wirelessly sending the contents of said created information to said center station device by one or both of voice and characters in a folded back manner, and
   wherein said center station device includes fold-back receiving means for receiving the voice or characters sent in a folded back manner and fold-back output means for outputting the voice or characters received in a folded back manner.

2. A wireless communication system as set forth in claim 1, wherein each of said slave station devices has voice-synthesizing means for creating analog voice corresponding to the contents of the created information by voice synthesis, and wherein said reporting means outputs the created analog voice.

3. A wireless communication system as set forth in claim 2, wherein said information to be processed which is sent wirelessly by said center station device is received by said slave station devices, and wherein the information stored in said storage means of each of said slave station devices or the information acquired by said acquisition means includes information intrinsic to each of said slave station devices.

4. A wireless communication system as set forth in claim 1, wherein said information to be processed which is sent wirelessly by said center station device is received by said slave station devices, and wherein the information stored in said storage means of each of said slave station devices or the information acquired by said acquisition means includes information intrinsic to each of said slave station devices.

5. A method of wireless communication in which a center station device and slave station devices communicate wirelessly, said method comprising:

wirelessly sending, from said center station device to said slave station devices, information to be processed by said slave station devices, wherein each of said slave station devices includes one or both of (i) storage means for storing information used for processing said information to be processed and (ii) acquisition means for acquiring information used for processing said information to be processed;

receiving, by each of said slave station devices, said information to be processed;

processing, by each of said slave station devices, the received information using one or both of the information stored in said storage means and the information acquired by said acquisition means;

reporting, by each of said slave station devices, contents of information created by said processing by means of one or both of voice and characters;

wirelessly sending, by each of said slave station devices, the contents of said created information to said center station device by one or both of voice and characters in a folded back manner;

receiving, by said center station device, the voice or characters sent in a folded back manner; and outputting, by said center station device, the voice or characters received in a folded back manner.

6. A center station device for wirelessly communicating with slave station devices, said center station device comprising:

sending means for wirelessly sending information to be processed by the slave station devices to the slave station devices, each of the slave station devices including one or both of (i) storage means for storing information used for processing said information to be processed and (ii) acquisition means for acquiring information used for processing said information to be processed, receiving means for receiving said information to be processed, processing means for processing the received information using one or both of the information stored in said storage means and the information acquired by said acquisition means, reporting means for reporting contents of information created by said processing means by means of one or both of voice and characters, and fold-back sending means for wirelessly sending the contents of said created information to said center station device by one or both of voice and characters in a folded back manner;

fold-back receiving means for receiving the voice or characters sent in a folded back manner; and fold-back output means for outputting the voice or characters received in a folded back manner.

7. A slave station device for wirelessly communicating with a center station device, said slave station comprising:

one or both of storage means for storing information and acquisition means for acquiring information;

receiving means for receiving information wirelessly sent from said center station device;

processing means for processing said received information using one or both of the information stored in said storage means and the information acquired by said acquisition means;

reporting means for reporting contents of information created by said processing means by means of one or both of voice and characters; and fold-back sending means for wirelessly sending the contents of said created information by one or both of voice and characters in a folded back manner to said center station device, wherein said center station device includes fold-back receiving means for receiving the voice or characters sent in a folded back manner and fold-back output means for outputting the voice or characters received in a folded back manner.

* * * * *